May 1, 1923.
H. R. HAUPT
TIRE
Filed May 24, 1920
1,453,351
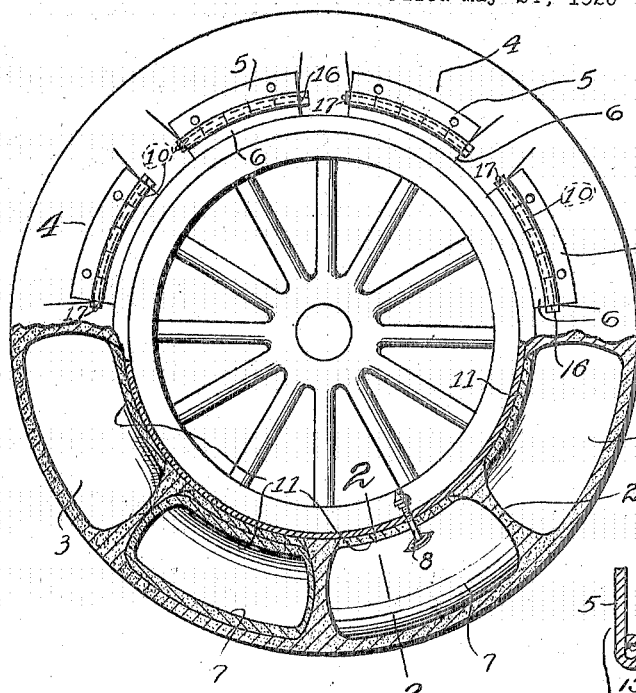
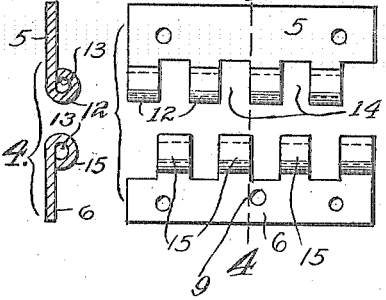
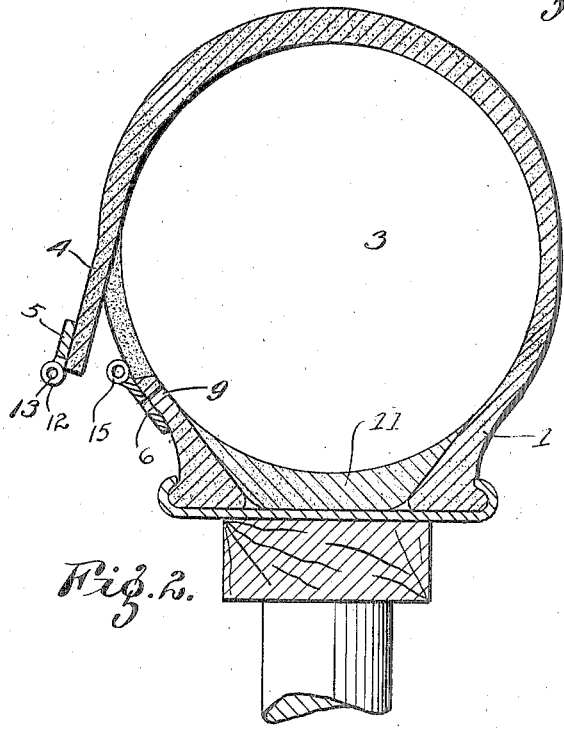
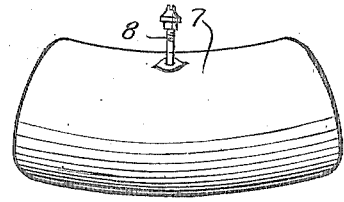
Inventor:
Harry R. Haupt,
By Hugh N. Wagner,
Att'y.

Patented May 1, 1923.

1,453,351

UNITED STATES PATENT OFFICE.

HARRY R. HAUPT, OF ST. LOUIS, MISSOURI.

TIRE.

Application filed May 24, 1920. Serial No. 383,730.

*To all whom it may concern:*

Be it known that I, HARRY R. HAUPT, a citizen of the United States, residing at the city of St. Louis, in the State of Missouri, have invented certain new and useful Improvements in Tires, of which the following is a specification.

The object of this invention is to provide a tire which is composed of a plurality of compartments, said compartments being filled individually with a resilient material so that in case the material in any one of said compartments is punctured or injured in any way, the cost and time necessary to replace said material will be reduced to a minimum. In the present instance, the casing of the rubber tire is divided into a plurality of compartments. These compartments are filled with individual inner tubes, said tubes being filled with a fluid, preferably compressed air. In order that these inner tubes may be placed in their respective compartments, doors or openings are provided in each compartment and, also, means for holding said doors in a closed position.

In the accompanying drawings forming part of this specification, in which like numbers of reference denote like parts wherever they occur, Figure 1 is a side elevation of a rubber tire showing my invention, parts being broken away so as to show the construction of said tire;

Figure 2 is a section taken on the line 2—2 of Figure 1;

Figure 3 is a view showing means for latching or fastening the doors of the various compartments of the tire;

Figure 4 is a section taken on the line 4—4 of Figure 3; and

Figure 5 is a detailed view of one of the members used to fill the compartments of said tire.

The casing 1 has a plurality of diaphragms or partitions 2 dividing said casing 1 into a plurality of compartments 3. Each compartment is provided with a door or flap 4 which has a locking member 5 mounted thereon. Said locking member registers with a second locking member 6 mounted upon said casing 1. The compartments 3 of the casing 1 are filled with inner tubes 7. These inner tubes are provided with the usual air valve 8, said valve extending through an opening 9 in the wall of the casing 1. In practice the inner tubes 7 are placed within the compartments 3 of the casing 1 in a deflated condition. The locking members 5 and 6 are then brought together and locked with a pin 10. The inner tube 7 is then filled with compressed air or any other fluid. In case of a puncture or injury to any one of the inner tubes 7 causing said inner tube 7 to deflate, the partition 2 of the casing 1 prevents the inner tube in the next compartment from extending down into the compartment occupied by the deflated tube. It is obvious that one of these inner tubes 7 may be replaced within the casing 1 quickly and at small expense. Figure 2 shows the mounting of the casing 1 on the rim of a clincher type. In order that the chambers 3 in the casing 1 may be substantially cylindrical in cross section a filler 11 is provided. This filler prevents the inner tube 7 from being chafed or injured by any corners in the chamber 3. The locking means of the doors 4 heretofore mentioned shall now be described. The upper member 5, which is attached to the doors 4 of the casing 1, is provided with extensions 12 which are cylindrical in cross section forming a cylindrical chamber or eye 13 which accommodates the bolt 10. These projections or eyes 12 are spaced apart along the lower edge of the member 5 forming spaces 14 between said eyes. These accommodate similar projections or eyes 15 on the lower member 6. These projections are formed in the same manner as the projections upon the upper member 5. When so placed the apertures 13 in the extensions 12 and 15 aline and permit the bolt 10 to pass from end to end of said locking members 5 and 6, as shown in the Figure 1. One end of the bolt 10 is provided with a head 16. The other end may be threaded to receive a thumb nut 17. After this nut 17 is tightened it becomes impossible for the bolt 10 to be accidentally withdrawn from the eyes 12 and 15. With this arrangement of parts it is obvious that a resilient vehicle tire is provided, constructed to cut down the expense of punctures, blow-outs, and other injuries that tires of this general type suffer from.

With reference to Figure 1 it will be observed that the locking plates 5 which are attached to the several flaps serve to stiffen the edge portions of the flaps so as to enable the flaps to withstand the strain incident to the inflation of the tire.

I claim:

A tire comprising a shoe of the clincher-type having the interior partitioned off into separate semi-cylindrical compartments, an inflatable inner tube in each compartment, and filler means of separate sections removably positioned between the clincher beads of the shoe for supporting the tubes of the compartments, each of said sections having a concaved face disposed to form a smooth continuance of the inner curved walls of the shoe whereby each compartment is rendered substantially circular in cross section to prevent pinching or chafing of the inner tube.

In testimony whereof I hereunto affix my signature.

HARRY R. HAUPT.